(No Model.)
J. L. McINTOSH, E. H. BACON & T. VAIL.
VEHICLE BRAKE.
No. 317,164. Patented May 5, 1885.
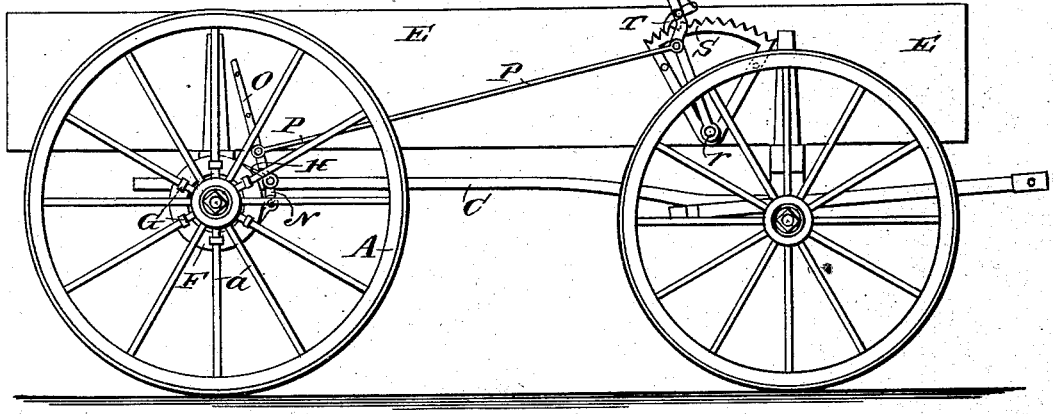
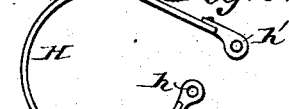
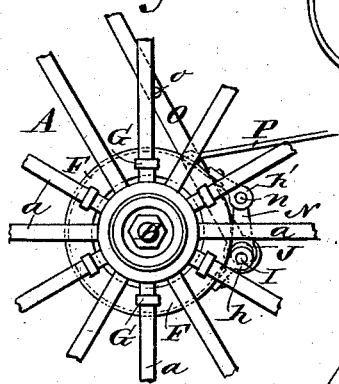
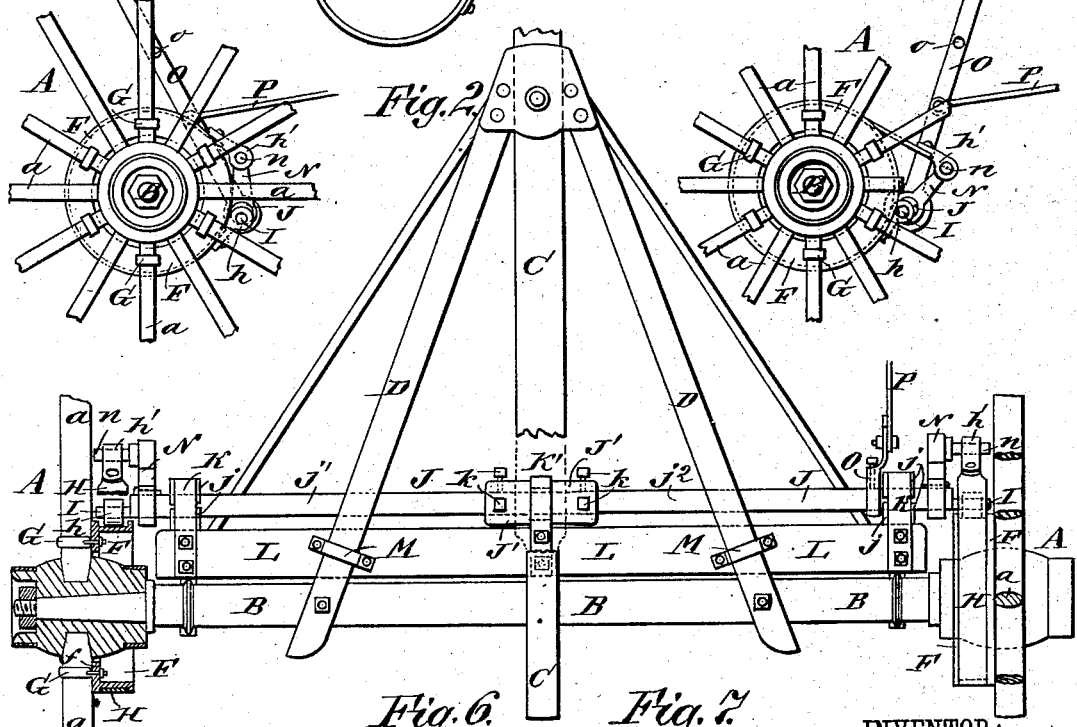
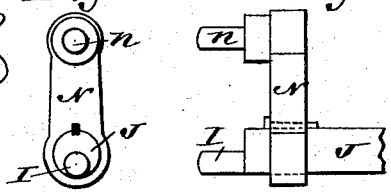
WITNESSES:
INVENTOR:
J. L. McIntosh
E. H. Bacon
T. Vail
BY Munn & Co
ATTORNEYS.

UNITED STATES PATENT OFFICE.

JOHN L. McINTOSH, EDWARD HAMLIN BACON, AND THERON VAIL, OF SAN ANTONIO, TEXAS.

VEHICLE-BRAKE.

SPECIFICATION forming part of Letters Patent No. 317,164, dated May 5, 1885.

Application filed March 5, 1885. (No model.)

*To all whom it may concern:*

Be it known that we, JOHN L. McINTOSH, EDWARD HAMLIN BACON, and THERON VAIL, all of San Antonio, in the county of Bexar and State of Texas, have invented a new and Improved Vehicle-Brake, of which the following is a full, clear, and exact description.

Our invention relates to brakes for controlling or stopping wheeled vehicles, and has for its object to provide a simple, effective, and durable brake, which may be applied without wrenching the body of the vehicle or stretching and loosening the wheel-tires.

The invention consists in the attachment of the end of the friction-band, which connects directly to the shaft, to an eccentric-pin on the shaft, whereby the band is tightened on the friction-drum with a vise-like grip when the brake is fully applied.

The invention consists, also, in particular constructions and combinations of parts of the brake, all as hereinafter fully described and claimed.

Reference is to be had to the accompanying drawings, forming part of this specification, in which similar letters of reference indicate corresponding parts in all the figures.

Figure 1 is a side elevation of a wagon with our improved brake attached. Fig. 2 is a sectional plan view of the rear parts of the wagon running-gear with the brake attached and partly broken away and in section. Fig. 3 is a detail side view of part of the hind wheel of the wagon with the brake "off" or released. Fig. 4 is a like view with the brake "on" or fully applied. Fig. 5 is a side view of the friction-band of the brake. Fig. 6 is a detail end view of the brake-shaft and crank, and Fig. 7 is a front view thereof.

The letter A indicates the hind wheels on the axle B, and C is the reach. D are the rear hounds, and E is the box, of an ordinary wagon.

The letter F indicates a friction drum or rim, which has a flange, $f$, through which the bolt ends of clips G pass for securing a drum, F, to the spokes $a$ of each of the hind wheels at their inner faces outside the wheel-hubs, which connection strengthens the wheel, and at the same time gives a substantial support to the brake-drums.

Around each drum F is placed the friction-brake band H, which has an eye, $h$, at one end, in which eye is placed the eccentrically-positioned stud I, formed on or fixed to the adjacent end of a shaft, J, which is journaled in side boxes, $j$, held by straps K or otherwise to a strong cross bar or beam, L, which is rigidly secured to the hounds D by the strap irons or clips M just in front of the hind axle, B; or said bar L may be secured directly to the hind axle in any approved way. The friction-band H has at its other end an eye, $h'$, in which enters the wrist-pin $n$ of a crank-arm, N, which is formed on or fixed to the adjacent end of the shaft J.

To the shaft J, at or near one end, and preferably at the right-hand side of the vehicle, is fixed by a set-screw, or otherwise, the lever O, which has a series of holes, as at $o$, into any one of which may pass a pivot-pin to connect the back end of the brake-rod P to the lever, and the forward end of said rod is connected to the brake-operating lever R, which, as shown, is pivoted to the box of the vehicle at $r$, and works along a catch-plate, S, into the teeth of which the spring-pressed pawl T of the lever may enter to lock the brake on or off, a trip-lever, T', being provided at the top of the lever R by which to lift the pawl from the catch-plate.

We make the shaft J preferably in two parts or sections, $j'\ j^2$, and provide a central socket-piece or collar, J', to receive the inner ends of the shaft-sections, which are held rigidly in the bore of the collar by set-screws $k$, as shown in Fig. 2; and the central strap, K', which supports the adjacent inner ends of the shaft-sections, fits within a recess formed around the sides of the collar J', and thus serves to prevent end movement of the collar and shaft J, so that by sliding the shaft-sections more or less into the collar J' and tightening the set-screws $k$ the shaft may be set to bring its crank-arms N and bands H into proper relative positions for effective action on friction drums or rims F, fixed to opposite wheels of vehicles whose axles vary somewhat in length, so that the bands H shall always have equal pressure on the rims F at opposite sides of the wagon, and when the shaft J is adjusted properly lengthwise the collar J' and strap K' serve as a thrust-bearing to hold the arms N and bands H to their work on the rims F.

The operation of the brake is as follows: When the brake-operating lever R is thrown back, as in Fig. 1, the brake-lever O will also be thrown back, as in Figs. 1 and 2, and the crank-arms N will stand about vertical, and the eccentric-pins I of shaft J will take their lowest positions, and the friction-bands H will by their elasticity spring away from or be held off the rims F. To apply the brake, the lever R will be moved forward to carry the lever O in the same direction, and turn the shaft J and cranks N forward more or less to tighten the bands H upon the rims F with more or less force to control the speed of the wagon on different grades of the road, as may be required, and as the shaft J turns forward the eccentric-pins I will swing toward the rims more or less, and when it is desired to fully apply the brake to stop the wagon the lever R will be forced fully forward, which will turn the eccentric-pins I sufficiently to carry the ends of the bands H next the pins against the rims F with a gradually-increasing force culminating in a vise-like grip, which securely locks the bands to the rims and prevents rotation of the wheels A on the axle B, as will readily be understood, and which is the position of the parts shown in Fig. 4, which shows the crank N carried forward to about an angle of forty-five degrees, and illustrates how the cranks may be forced down forward from that position to a horizontal position as the brake bands and rims wear slowly by use.

It is evident that as the friction-rims F are attached to the strongest available parts of the wheels, and as the shaft J is supported next the hind axle at the strongest part of the running-gear, the resultant direct or reactionary strains in applying the brake do not come upon the wagon-box when a box is used, or upon a weak part of the running-gear, as in other brakes, which when applied tend to wrench the wagon apart; and by using the friction rims and bands the wheels are not wrenched and their tires are not stretched and loosened so they fall off, as happens with the ordinary shoe-brakes applied to the wheel-tires.

The shaft J may be supported in bearings of long brackets or arms secured directly to the hind axle, and the bar L be dispensed with; but by using said bar the brake mechanism may be more conveniently attached to some styles of vehicles.

It will be seen that our improved brake mechanism is connected to the running-gear independently of the reach C, so that when the wagon-box is removed at any time a longer reach may be applied to the running-gear when hauling long lumber and the like, and the brake-bands H may be forced to the wheel-rims F by direct pressure of the foot or hand on the lever O, or by the pull of a rope held by a person on horseback or afoot, as will readily be understood.

Having thus described our invention, what we claim as new, and desire to secure by Letters Patent, is—

1. A vehicle-brake comprising a friction rim or drum fixed to the wheel, a friction-band encircling the drum and connected at one end to an eccentric-pin on a brake-shaft journaled in bearings held to the rear hounds or axle, and connected at the other end to a wrist-pin on a crank-arm fixed to said shaft, and means for turning the shaft, substantially as set forth.

2. A vehicle-brake comprising a friction rim or drum fixed to the wheel, a friction-band encircling the drum, and connected at one end to an eccentric-pin on a shaft journaled in bearings held to the rear hounds or axle, and connected at the other end to a wrist-pin on a crank-arm fixed to said shaft, which is provided with a lever to which the brake-operating rod or rope is connected, substantially as herein set forth.

3. The combination, in a vehicle-brake, of the drums F, fixed to wheels A, the friction-bands H, encircling the drums and connected at one end to eccentric-pins I on the shaft J, journaled in boxes held to a cross-beam, L, and connected at the other end to a wrist-pin, n, of a crank-arm, N, on shaft J, and said beam L being connected to the rear hounds, D, or to the axle B, and the lever O, rod P, and a connected operating-lever, substantially as herein set forth.

4. The combination, in a vehicle-brake, of the drums F, fixed to wheels A, the friction-bands H, encircling the drums and connected at one of their ends to the outer ends of a shaft, J, which is made in two sections, $j' j^2$, supported in straps and boxes K $j$, and in a collar, J', which latter is recessed and supported by a strap, K', entering said recess and forming an endwise-thrust bearing for the shaft-sections, and said straps K K' being connected to a beam, L, fastened to the rear hounds, D, or directly to the axle, and said bands H being connected at their other ends to wrist-pins $n$ of crank-arms N, fixed to shaft J, and a lever, O, or equivalent means for turning said shaft, substantially as herein set forth.

JOHN L. McINTOSH.
EDWARD H. BACON.
THERON VAIL.

Witnesses:
JNO. H. COPELAND,
CHARLES E. PORFERT.